United States Patent [19]

Liefkens et al.

[11] 4,419,415
[45] Dec. 6, 1983

[54] MAGNETIC HEAD COMPRISING TWO SPOT WELDED METAL PLATES

[75] Inventors: Adrianus C. H. J. Liefkens; Gerardus J. A. M. Notenboom, both of Eindhoven, Netherlands

[73] Assignee: U.S. Philips Corporation, New York, N.Y.

[21] Appl. No.: 339,931

[22] Filed: Jan. 18, 1982

[30] Foreign Application Priority Data

May 2, 1981 [NL] Netherlands .................. 8100545

[51] Int. Cl.³ .................................................. G11B 5/16
[52] U.S. Cl. .................................. 428/594; 428/682; 360/126
[58] Field of Search ............. 428/594, 611, 678, 682; 228/208, 209, 179, 190; 427/104, 127, 123; 360/126; 29/603; 219/127, 129, 85 CA, 85 CM, 85 M

[56] References Cited

U.S. PATENT DOCUMENTS

| | | | |
|---|---|---|---|
| 3,005,086 | 10/1961 | Watter | 219/85 CM |
| 3,065,537 | 11/1962 | Patriaria | 228/209 |
| 3,092,897 | 6/1963 | Agner | 228/190 |
| 3,246,384 | 4/1966 | Vice | 228/190 |
| 3,454,728 | 7/1969 | Siegemund | 360/126 |
| 4,071,730 | 1/1978 | Bassler | 219/85 CM |
| 4,168,187 | 9/1979 | Takayanagi et al. | 148/31.55 |
| 4,177,089 | 12/1979 | Bankson | 148/31.55 |
| 4,205,118 | 5/1980 | Schubert | 428/594 |
| 4,217,613 | 8/1980 | Schwartz | 29/603 |
| 4,318,965 | 3/1982 | Blair | 428/594 |

FOREIGN PATENT DOCUMENTS

| | | | |
|---|---|---|---|
| 53-125810 | 11/1978 | Japan | 360/126 |
| 586585 | 4/1977 | Switzerland | 219/127 |

OTHER PUBLICATIONS

*Metals handbook,* Lyman et al., vol. 6, "Welding and Brazing", American Society for Metals, 1973, pp. 643-644, 713-715.
"Iron-Base High Magnetic Permeatility Alloys for Magnetic Recording and a Reproducing Head", Research Institute of Electric and Magnetic Alloys, Chemical Abstracts 93: 196736g, 1980.
"Magnetic Core for Magnetic Tape Recorder", Satomi et al., Chemical Abstracts 91:67624d, 1979.
"Magnetic Core Materials for Audio Magnetic Heads", Shinagawa, Chemical Abstracts 94:6402v, 1981.

*Primary Examiner*—L. Dewayne Rutledge
*Assistant Examiner*—J. J. Zimmerman
*Attorney, Agent, or Firm*—Joseph P. Abate

[57] ABSTRACT

A magnetic recording head may be assembled from laminar plates of ferromagnetic material which are welded together by spot welds to form a core stack. The core stack is welded by spot welds (E, F, G) to a base plate (16). The ferromagnetic material is typically an alloy of Si, Al and Fe and tends to produce stress cracks around the areas of the welds. In order to overcome this problem, the edges of the plates, at least around the areas of the welds, and provided with a layer of ductile metal such as Ni, Fe or Mo. The layer is between 5 and 500 μm thick. The depth of the welds is arranged to lie substantially within the ductile metal layer.

12 Claims, 5 Drawing Figures

MAGNETIC HEAD COMPRISING TWO SPOT WELDED METAL PLATES

BACKGROUND OF THE INVENTION

The invention relates to a magnetic head comprising at least two metal plates at least one of which comprises a ferromagnetic alloy, which are spot welded together along an interface.

Specific examples of such magnetic heads are magnetic heads with ferromagnetic lamellae assemblies, magnetic heads having a tape contact face consisting of a ferromagnetic plate or plates, magnetic heads with ferromagnetic lamellae welded on a base plate, and magnetic heads with butt welded magnetic core halves of ferromagnetic lamellae. In all these cases, there is a plate shaped ferromagnetic component which is pointwise spot welded to a second plate shaped component either also of ferromagnetic material or of another metal. A conventional contactless welding method may be used, such as electric arc welding, laser welding, electron beam welding, or plasma welding. These contactless welding methods are particularly suitable because they have the advantages that there is no mechanical load such as occurs in resistance welding upon applying the electrodes, that a large amount of energy can be supplied during a short time to produce a fusion weld without detrimental heating of the components, and also the danger of the components moving relative to each other is reduced.

A typical ferromagnetic alloy for use in magnetic heads comprises 4 to 12% by weight of Si, 3 to 18% by weight of Al, the balance being Fe together with the usual impurities. Various modifications to this alloy may be employed which comprise various additions: for example, up to 5% by weight of P (see German Offenlegungsschrift No. 2,944,790); up to 7% by weight of yttrium and/or rare earth metals (see U.S. Pat. No. 4,065,330); a quantity of B (see German Auslegeschrift No. 2,604,057); a quantity of Ti, Zr, Mn, Nb, Ta, Mo, Cr, V and/or W (see British Pat. No. 1,513,298); up to 3% by weight of Hf, Th, Sc, Cd and/or Mg (see U.S. Pat. No. 3,663,767).

When one of the components to be welded together comprises an Al-Fe-Si alloy, crack formation often occurs in the Al-Fe-Si component around the area of the welds. In Japanese Patent Application No. 52-9709, laid open to public inspection as Kokai No. 53-95847, said crack formation is ascribed to the formation of stresses as a result of the rapid cooling of the material after the welding operation; the solution proposed is to preheat the components to be welded together at a temperature between 300° and 1400° C., the exact preheating temperature depending on the particular Al-Fe-Si composition used and preferably being above 1000° C. However, this method has not been proven to be entirely satisfactory because it is less suitable for mass production.

SUMMARY OF THE INVENTION

It is the object of the present invention to enable plates of ferromagnetic material for use in magnetic heads to be welded together or to plates of other materials without a preheating step or the like being necessary.

The invention provides an assembly as described in the opening paragraph characterized in that the ferromagnetic plate(s) is/are provided with, at least over the areas occupied by the welds, a readily adhering ductile metal layer between 5 and 500 $\mu$m thick. It has been found that with such an intermediate layer a good connection can be obtained without subjecting the ferromagnetic material to stresses causing cracks upon cooling. As the ductile layer becomes thinner, the mechanical strength of the ultimate joint between the plates decreases; thicknesses of less than 5 $\mu$m are no longer suitable for the present purpose. Thicknesses of more than 500 $\mu$m have the disadvantage that the time taken to provide the ductile metal layer becomes excessive. (Electroplating is carried out, for example, at a rate of 35 $\mu$m per hour). A thickness which has proven very suitable in practice lies around 100 $\mu$m so that, in general, thicknesses between 50 and 200 $\mu$m are most convenient.

A magnetic head according to the invention is more in particular characterized in that the ductile layer may comprise Ni, Fe and/or Mo and may adjoin a surface of the ferromagnetic plate having a deformed crystal structure.

The invention also relates to a laminar ferromagnetic component for use in a magnetic head, in which at least one surface of the component is provided with a ductile metal layer between 5 and 500 $\mu$m thick, conveniently between approximately 50 and 200 $\mu$m thick.

BRIEF DESCRIPTION OF THE DRAWING

An embodiment of the invention will now be described by way of example, with reference to the accompanying drawing, in which.

DESCRIPTION OF THE PREFERRED EMBODIMENT

Figure 1:
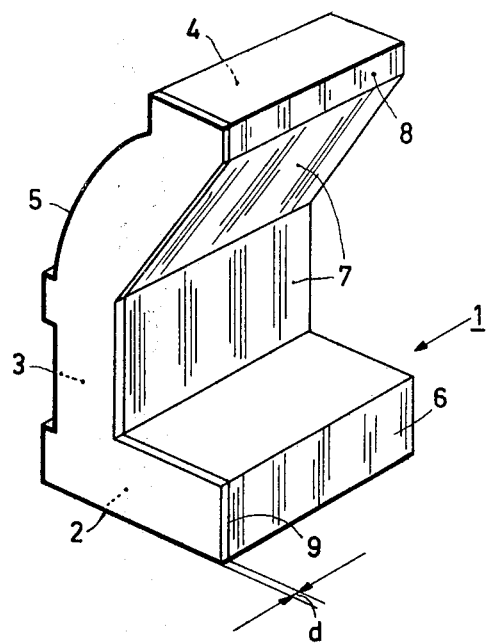
FIG. 1 shows a profiled block of an Al-Fe-Si alloy which is provided on the outside with a ductile layer and from which lamellae for a magnetic head are obtained.

The first step in the manufacture of lamellae for a magnetic head comprises casting a solid block of, for example, rectangular cross section from a material having the desired Al-Fe-Si composition. A composition comprising 9.6% by weight Si; 5.8% by weight Al; remainder Fe is very suitable for use in magnetic heads. After subjecting the block to an external grinding operation and to a profile grinding operation, a block 1 having a shape as shown in FIG. 1 is obtained. The cross section of the block 1 represents the starting shape of a magnetic head lamella. Alternatively, grinding may first be performed externally only and an internal profile provided at a later stage of the process. Such a block of magnetic material is generally subjected, after grinding, to an annealing operation to restore the magnetic properties. The surfaces 2, 3 and 4 are provided with a ductile metal layer 5. The surfaces 6 and 8 may remain free from a ductile layer in order that they may serve as reference faces in the subsequent process steps. In this example, the layer 5 has a thickness of 100 $\mu$m and is preferably not thinner than 50 μm and not thicker than 200 μm.

If necessary, block 1 may be subsequently machined in order to ensure that the outside dimensions satisfy the required tolerances. Ultimately, block 1 is divided into a number of core lamellae 9, which, if necessary, are ground to the desired thickness d and are then annealed.

Figure 2:
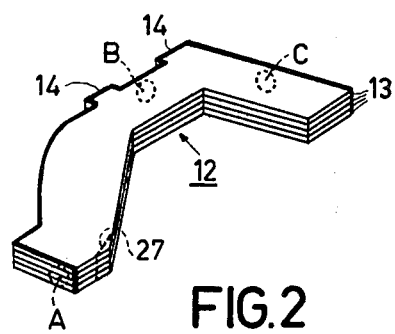
FIG. 2 shows a core part consisting of welded lamellae suitable for use in a magnetic head.

A number of lamellae (for example, four) are combined to form a core part. FIG. 2 shows such a core part (or core half) 12 having four lamellae 13 which are held together by means of welds at the points A, B and C. As shown in FIG. 2, a weld extends into the ductile layers in a direction toward the minor faces of the lamellae 13. The welding depth may be such that welding does not extend through the complete thickness of the ductile layer (see FIG. 4) in order that the properties of the material of the lamellae are influenced as little as possible. In the example shown, the welds are present at the outside of the core part 12, but they may also be present at the inside, or be distributed over the inside and the outside.

Figure 4:
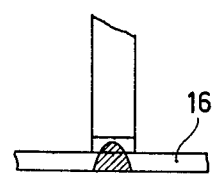
FIG. 4 is a sectional view on an enlarged scale through two welded lamellae of the core part of FIG. 2.

A pulsed (solid-state) laser, for example, an Nd-YAG laser transmitting light having a wavelength of 1.06 μm, may be used to perform the welding operation. In the example of FIGS. 2 and 4, the lamellae 13 had a thickness of 300 μm and were covered on their outside with an electroplated nickel layer of 100 μm thickness. The welding duration per weld was 3 milliseconds, the welding energy 1 Joule and the diameter of the radiation places, the spot size, was 500 μm. The welding took place in a slightly reducing atmosphere. The lamellae 13 are electrically insulated from each other by a thin oxide skin 15 (FIG. 4) approximately 600 Å thick.

Figure 3:
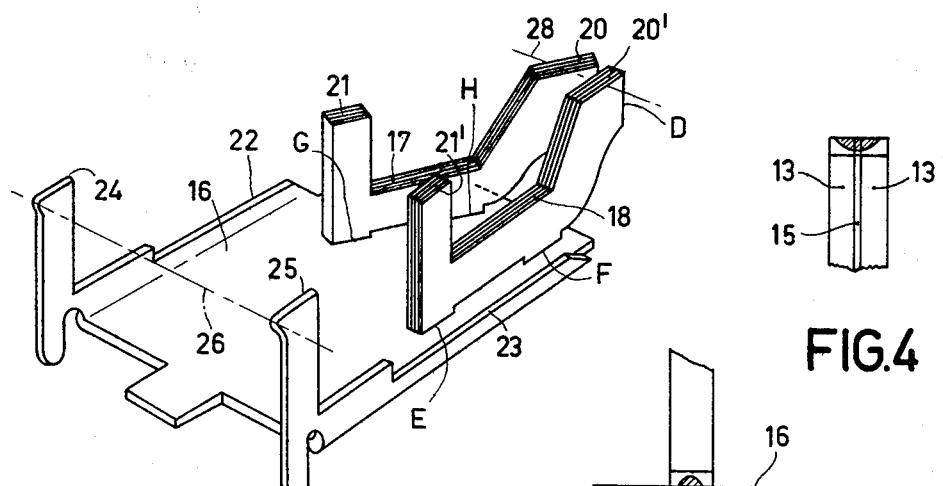
FIG. 3 shows a base plate on which two core parts as shown in FIG. 2 are secured.
Figure 5:
FIG. 5 is a sectional view on an enlarged scale through a lamella and the base plate of FIG. 4 at the area of a weld.

The lamellae 13 may furthermore have abutting surfaces 14 by which they can be welded to a base plate. The projections 14 are present outside the actual magnetic circuit and the welding operation to which they are subjected will consequently not substantially influence the magnetic properties of the lamellae. FIG. 3 shows a base plate 16 on which two core parts 17 and 18 of the type shown in FIG. 2 are welded in the areas E, F, G and H after having been accurately positioned by means of a jig. The core parts 17, 18 may also be welded together on the upper side (point D) so as to promote the stability of the assembly during grinding of the slot faces 20, 20' and 21, 21' which is carried out at a later stage of the process. In this example, the base plate 16 was of stainless steel having a thickness of 500 μm and the welding process was carried out in a similar manner to that described hereinbefore except that the welding energy was now 4 Joules because welding was carried out through the base plate 16; see FIG. 5. The base plate 16 has upright edges 22, 23 and upstanding portions 24, 25 which, during the grinding process of the slot surfaces, are also ground so that they become located in the same plane as the slot faces and may serve as reference faces. Along the lower side of the slot faces 20, 20', material is ground away parallel to the line 26 joining the reference faces 24, 25 so that inclined faces 27 in FIG. 2 are obtained. The lower side of the slot faces 20, 20' denoted by the line 28 thus becomes located at a fixed distance from and parallel to the reference line 26. To produce a magnetic head, the base plate 16 is placed opposite to a second base plate on which two core parts corresponding to the core parts 17, 18, have been welded and is combined therewith. Prior to combining the base plates, non-magnetic spacers in the form of thin layers may be deposited on the slot faces 20, 20' and coils slotted on the core parts 17, 18.

In all the above-described welding steps the Al-Fe-Si components to be welded should be provided with a ductile metal layer which not only readily adheres to Al-Fe-Si but can also be readily welded. The composition of the ductile layer is of great importance. Ni and Ni alloys have proved suitable, but other materials which readily absorb laser radiation of 1 μm wavelength and readily adhere to Al-Fe-Si such as Fe and Mo, are also suitable. The adherence of the ductile metal layer may be assisted by deforming the crystal structure of the surface of the Al-Fe-Si alloy. The required deformation can be realized in various manner such as thermal etching and radiation with a mineral radiation agent. For providing the ductile metal layer on the side surfaces of the cast block to the required thickness, an electrolytic process may be used. However, when the starting material is not a cast block but separate lamellae etched from a band of Al-Fe-Si, plasma spraying may be a more convenient method. In particular the latter method presents the possibility of first assembling a number of lamellae to form a stack after which the ductile metal layer sprayed on the edges of the lamellae holds the stack together during the welding process.

The ductile layer may consist of, for example, a thin layer of 1 to 2 μm Ni which may be provided by means of vapor deposition, sputtering or electroless deposition, on which a thicker layer of a material, which grows more rapidly than Ni, can readily be welded but adheres less readily to Al-Fe-Si than Ni, may be provided.

What is claimed is:

1. A magnetic head, comprising:
   at least one core part having magnetic properties and including two stacked parallel plates each having a minor face, the plates being formed of a material consisting essentially of Al-Fe-Si,
   readily adhering ductile metal layers each having an essentially equal thickness in a range between 5 and 500 μm provided on respective minor faces of the plates, the layers being arranged substantially adjacent one another so that the plates are mutually securable by welding the layers, and
   a weld located in the layers, the weld extending a maximum depth into the layers in a direction generally toward the minor faces, the maximum depth being less than the thickness of each layer so that the weld mutually secures the plates without affecting their magnetic properties.

2. A head as claimed in claim 1, wherein each ductile metal layer has a thickness in a range between 50 and 200 μm.

3. A head as claimed in claim 1, wherein each ductile layer is a metal selected from the group consisting of Ni, Fe and Mo.

4. A head as claimed in claim 1, wherein each layer includes a sublayer consisting essentially of Ni for bonding the ductile metal layer to a respective minor face.

5. A head as claimed in claim 1, wherein each minor face on which a metal layer is provided has a deformed crystal structure.

6. A magnetic head assembly, comprising:
   a core part having magnetic properties and formed of a material consisting essentially of Al-Fe-Si, the part including a projection having a minor face;

a readily adhering ductile metal layer having a thickness in a range between 5 and 500 μm provided on the minor face;

a base plate having a major face, the core part being supported by the major face and being arranged such that the ductile metal layer adjoins the major face, and a weld located in the base plate and in the layer, the weld traversing the major face and extending a maximum depth into the layer in a direction generally toward the minor face, the maximum depth being less than the thickness of the layer, whereby the core part is secured to the plate and the magnetic properties of the core part are substantially unaffected by the weld.

7. An assembly as claimed in claim 6, wherein the minor face of the core part on which the metal layer is provided has a deformed crystal structure.

8. An integral core part for a magnetic head, comprising:

at least two stacked laminar components having magnetic properties and formed of a material consisting essentially of Al-Fe-Si, each component having a minor face;

a readily adhering ductile metal layer having a thickness in a range between 5 and 500 μm provided on each minor face, each layer having essentially an equal thickness and being arranged substantially adjacent one another so that the components are mutually securable by welding the layers, and a weld located in the layers, the weld extending a maximum depth into both layers in a direction generally toward the minor faces, the maximum depth being less than the thickness of each layer so that the plates are mutually secured and the magnetic properties of the plates are essentially unaffected by the weld.

9. A core part as claimed in claim 8, wherein each ductile metal layer has a thickness in a range between 50 and 200 μm.

10. A core part as claimed in claim 9, wherein each ductile layer is a metal selected from the group consisting of Ni, Fe and Mo.

11. A core part as claimed in claim 9, wherein each ductile metal layer is formed of a Ni alloy.

12. A core part as claimed in claim 8, wherein each minor face on which a ductile metal layer is provided has a deformed crystal structure.

* * * * *

UNITED STATES PATENT AND TRADEMARK OFFICE
CERTIFICATE OF CORRECTION

PATENT NO. : 4,419,415
DATED : December 6, 1983
INVENTOR(S) : ADRIANUS C.H.J. LIEFKENS ET AL It is certified that error appears in the above-identified patent and that said Letters Patent is hereby corrected as shown below:

IN THE ABSTRACT: line 9, change "and" to --are--.

Col. 1, line 13, after "plate or" insert --ferromagnetic--;

Col. 2, line 22, change ", in which at" to --. At--;

line 41, change "of the core part of Fig. 2" to --according to the invention--;

line 44, change "4" to --3--;

Col. 3, line 14, change "may" to --must--;

line 25, change "example" to --examples--;

after "13" insert --each--;

line 26, before "and" insert --, respectively,--;

change "outside" to --outsides--.

UNITED STATES PATENT AND TRADEMARK OFFICE
CERTIFICATE OF CORRECTION

PATENT NO. : 4,419,415

DATED : December 6,1983

INVENTOR(S) : ADRIANUS C.H.J. LIEFKENS ET AL

It is certified that error appears in the above—identified patent and that said Letters Patent is hereby corrected as shown below:

Col. 4, line 3, after "steps" insert --,--;

line 14, change "manner" to --manners--;

line 22, after "particular" insert --,--;

Signed and Sealed this

Third Day of September 1985

[SEAL]

Attest:

DONALD J. QUIGG

Attesting Officer  Acting Commissioner of Patents and Trademarks - Designate